(12) United States Patent
Lee et al.

(10) Patent No.: US 12,720,412 B2
(45) Date of Patent: Aug. 25, 2026

(54) ELECTRONIC DEVICE FOR REDUCING POWER CONSUMPTION DUE TO WIRELESS COMMUNICATION, AND OPERATING METHOD THEREFOR

(71) Applicant: Samsung Electronics Co., Ltd., Suwon-si (KR)

(72) Inventors: Sanghyun Lee, Suwon-si (KR); Eunsoo Bae, Suwon-si (KR); Jungmin Oh, Suwon-si (KR); Byungho Hong, Suwon-si (KR); Byungki Moon, Suwon-si (KR); Kwanghee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 18/316,696

(22) Filed: May 12, 2023

(65) Prior Publication Data

US 2023/0284118 A1 Sep. 7, 2023

Related U.S. Application Data

(63) Continuation of application No. PCT/KR2021/016896, filed on Nov. 17, 2021.

(30) Foreign Application Priority Data

Dec. 15, 2020 (KR) ........................ 10-2020-0175669

(51) Int. Cl.

| | |
|---|---|
| ***H04W 48/04*** | (2009.01) |
| ***H04W 48/16*** | (2009.01) |
| ***H04W 60/04*** | (2009.01) |

(52) U.S. Cl.
CPC ........... *H04W 48/04* (2013.01); *H04W 48/16* (2013.01); *H04W 60/04* (2013.01)

(58) Field of Classification Search
CPC ..... H04W 48/04; H04W 48/16; H04W 60/04; H04W 48/20; H04W 60/00; H04W 52/02;
(Continued)

(56) References Cited

U.S. PATENT DOCUMENTS

| | | | |
|---|---|---|---|
| 8,582,455 | B2 | 11/2013 | Mudrick et al. |
| 8,989,743 | B2 | 3/2015 | Sane |

(Continued)

FOREIGN PATENT DOCUMENTS

| | | | |
|---|---|---|---|
| CN | 110691344 | A | 1/2020 |
| JP | 6261571 | B2 | 1/2018 |

(Continued)

OTHER PUBLICATIONS

International Search Report dated Feb. 21, 2022, issued in an International Application No. PCT/KR2021/016896.

(Continued)

*Primary Examiner* — Kwang B Yao
*Assistant Examiner* — Patrick Yipao Pei
(74) *Attorney, Agent, or Firm* — Jefferson IP Law, LLP

(57) ABSTRACT

A device and a method for reducing power consumption due to wireless communication in an electronic device are provided. The electronic device includes a sensor, a wireless communication circuit and a communication processor, wherein the communication processor can check a channel state while connected to a network through the wireless communication circuit, can check the movement state of a wearable device through the sensor if the channel state satisfies the specified condition related to network access restriction, can perform a cell search in a first period after a specified first time has elapsed if the wearable device is in a stationary state, and can perform a cell search in a second period that is relatively shorter than the first period if the wearable device is in a mobile state.

20 Claims, 10 Drawing Sheets

(58) Field of Classification Search
CPC ............. H04W 88/02; H04W 52/0254; H04W 52/0245; Y02D 30/70
See application file for complete search history.

(56) References Cited

U.S. PATENT DOCUMENTS

| | | | | |
|---|---|---|---|---|
| 9,380,519 | B2 | 6/2016 | Lee et al. | |
| 9,810,763 | B2 | 11/2017 | Nakao | |
| 10,715,987 | B2 | 7/2020 | Zavesky et al. | |
| 10,820,248 | B2 | 10/2020 | Gao et al. | |
| 10,887,834 | B2 | 1/2021 | Ryoo et al. | |
| 2003/0129947 | A1 | 7/2003 | Matsuki | |
| 2014/0295820 | A1 | 10/2014 | Kim et al. | |
| 2015/0163745 | A1 | 6/2015 | Kim et al. | |
| 2017/0164291 | A1* | 6/2017 | Ludwig | H04W 4/80 |
| 2018/0316376 | A1 | 11/2018 | Kim et al. | |
| 2019/0166553 | A1* | 5/2019 | Ryoo | H04W 76/27 |
| 2020/0128467 | A1* | 4/2020 | Gao | H04W 36/0088 |
| 2021/0120562 | A1 | 4/2021 | Xu et al. | |
| 2021/0352588 | A1 | 11/2021 | Liu et al. | |

FOREIGN PATENT DOCUMENTS

| | | | |
|---|---|---|---|
| JP | 6567768 | B2 | 8/2019 |
| KR | 10-0521714 | B1 | 10/2005 |
| KR | 10-2014-0091697 | A | 7/2014 |
| KR | 10-2015-0021490 | A | 3/2015 |
| KR | 10-2017-0128152 | A | 11/2017 |
| WO | 2019-242154 | A1 | 12/2019 |
| WO | 2020-034608 | A1 | 2/2020 |

OTHER PUBLICATIONS

Korean Office Action dated Apr. 7, 2026, issued in Korean Application No. 10-2020-0175669.

* cited by examiner

500
START
501
OPERATE TIMER RELATED TO CELL SEARCH RESTRICTION
503
RESTRICT DATA TRANSMISSION
505
IS OPERATION OF TIMER TERMINATED?
NO
YES
507
PERFORM CELL SEARCH ACCORDING TO FIRST PERIOD
509
IS MOVEMENT STATE SWITCHED?
NO
YES
511
PERFORM CELL SEARCH ACCORDING TO SECOND PERIOD
END

ELECTRONIC DEVICE FOR REDUCING POWER CONSUMPTION DUE TO WIRELESS COMMUNICATION, AND OPERATING METHOD THEREFOR

CROSS-REFERENCE TO RELATED APPLICATION(S)

This application is a continuation application, claiming priority under § 365(c), of an International application No. PCT/KR2021/016896, filed on Nov. 17, 2021, which is based on and claims the benefit of a Korean patent application number 10-2020-0175669, filed on Dec. 15, 2020, in the Korean Intellectual Property Office, the disclosure of which is incorporated by reference herein in its entirety.

BACKGROUND

1. Field

The disclosure relates to a device and a method for reducing power consumption due to wireless communication in an electronic device.

2. Description of Related Art

With the development of information and communication technology and semiconductor technology, various types of electronic devices are developing into multimedia devices providing a diversity of multimedia functions. The multimedia functions may include at least one of a voice call function, a video call function, a message function, a broadcast function, a wireless Internet function, a camera function, an electronic payment function, or a content playback function.

Electronic devices are evolving into various types to enhance the convenience of users in using multimedia functions. For example, an electronic device may be configured as a form that a user can wear (e.g., a wearable device), such as clothes, glasses, a watch, or a bracelet.

The above information is presented as background information only to assist with an understanding of the disclosure. No determination has been made, and no assertion is made, as to whether any of the above might be applicable as prior art with regard to the disclosure.

SUMMARY

When an electronic device (e.g., a wearable device) is disconnected from a wireless network and fails to find an accessible cell (e.g., cell lost), the electronic device may perform an operation (e.g., recovery operation) of finding a serviceable cell. When the electronic device is positioned in a service-restricted area (e.g., a shadow area), the electronic device may repeatedly perform an operation of finding a serviceable cell, which may cause unnecessary power consumption.

The wearable device may connect to a wireless network separately from an external electronic device, such as a smartphone. For example, when the wearable device includes a subscriber identity module (SIM), the wearable device is able to independently communicate with the wireless network without assistance of the external electronic device. The wearable device may be configured in a form wearable by a user, and may have a relatively small-sized battery compared to the external electronic device, such as the smartphone.

Due to a limited capacity of the battery of the wearable device, when the wearable device repeatedly performs an operation of finding a serviceable cell while positioned in a service-restricted area, an operating time of the wearable device may be reduced.

Aspects of the disclosure are to address at least the above-mentioned problems and/or disadvantages and to provide at least the advantages described below. Accordingly, an aspect of the disclosure is to provide a device and a method for reducing power consumption due to wireless communication in an electronic device (e.g., a wearable device).

Additional aspects will be set forth in part in the description which follows and, in part, will be apparent from the description, or may be learned by practice of the presented embodiments.

In accordance with an aspect of the disclosure, an electronic device (e.g., a wearable device) is provided. The electronic device includes a sensor, a wireless communication circuit, and a communication processor operatively connected to the sensor and the wireless communication circuit, wherein the communication processor is configured to identify a state of a channel in a state of being connected to a network through the wireless communication circuit, identify a movement state of the wearable device through the sensor when the state of the channel satisfies a specified condition related to connection restriction of the network, perform cell search according to a first period after a lapse of a specified first time when the wearable device is in a stationary state, and perform cell search according to a second period relatively shorter than the first period when the wearable device is in a moving state.

In accordance with another aspect of the disclosure, an operating method of an electronic device (e.g., a wearable device) is provided. The operating method includes identifying a state of a channel of a network in a state of being connected to the network, identifying a movement state of the wearable device when the state of the channel satisfies a specified condition related to connection restriction of the network, performing cell search according to a first period after a lapse of a specified first time when the wearable device is in a stationary state, and performing cell search according to a second period relatively shorter than the first period when the wearable device is in a moving state.

According to various embodiments, an electronic device (e.g., a wearable device) may adaptively perform an operation of searching a serviceable cell, based on a movement state (e.g., a stationary state or a moving state) of the electronic device, thereby reducing power consumption due to wireless communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
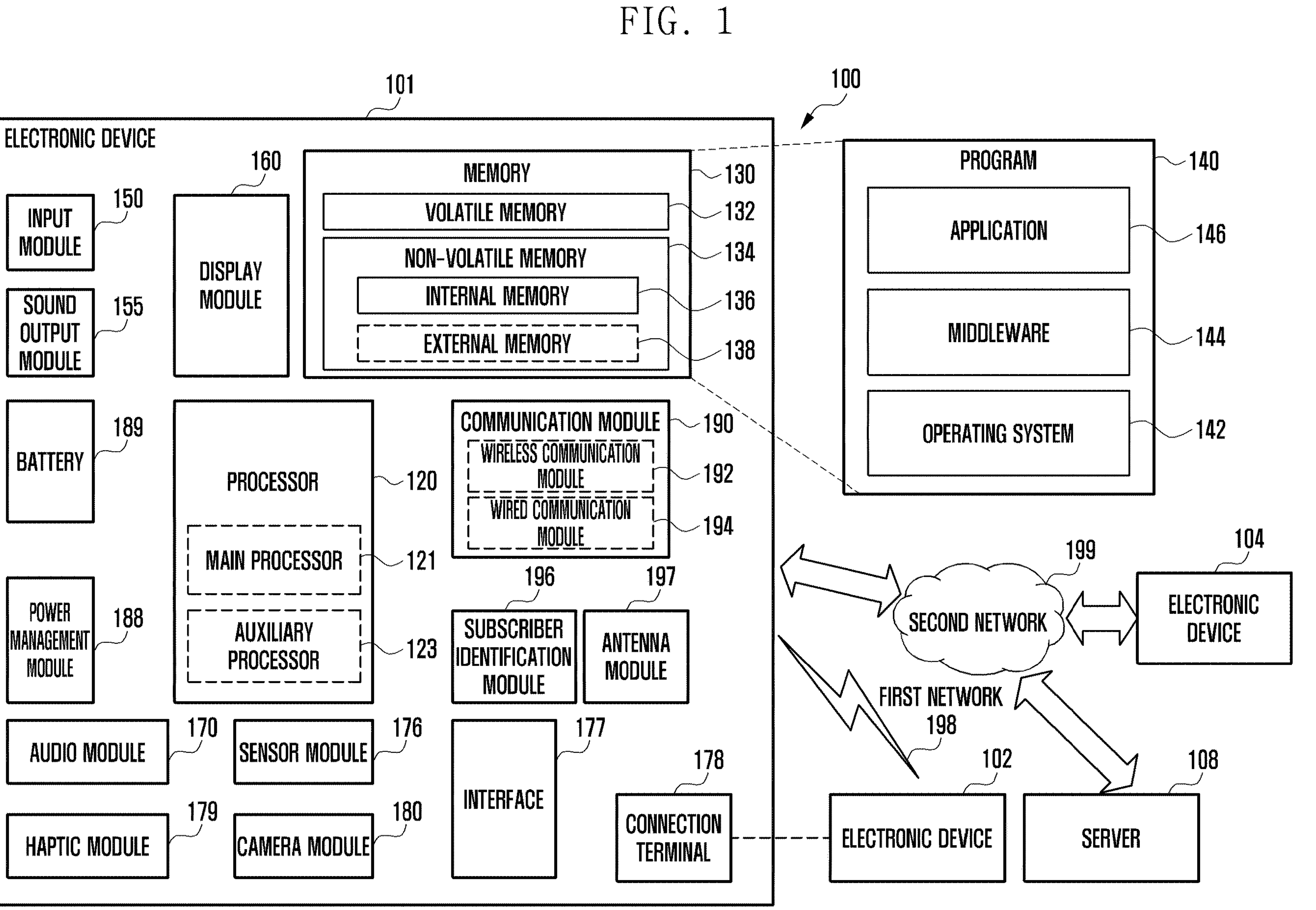
FIG. 1 is a block diagram of an electronic device in a network environment according to an embodiment of the disclosure.

FIG. 1 is a block diagram illustrating an example electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively,” as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following description, an electronic device may include an electronic device that is capable of accessing a wireless communication network to independently provide a wireless communication function, includes a battery having a relatively small capacity, and has relatively low antenna performance. For example, the electronic device may include a wearable device (or a low-end smartphone).

Figure 2:
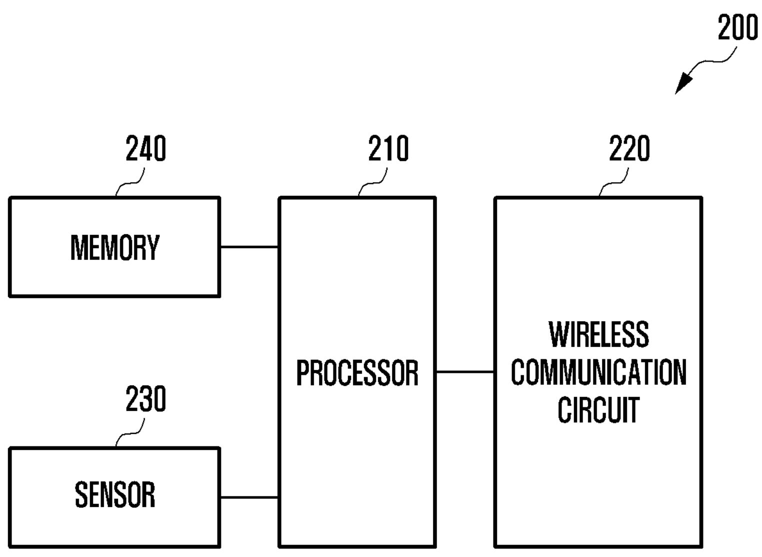
FIG. 2 is a block diagram of an electronic device that performs cell search according to an embodiment of the disclosure.

FIG. 2 is a block diagram of an electronic device that performs cell search according to an embodiment of the disclosure. According to an embodiment, the electronic device 200 of FIG. 2 may be at least partially similar to the electronic device 101 of FIG. 1, or may further include other embodiments of the electronic device.

Referring to FIG. 2, according to various embodiments, the electronic device 200 may include a processor (e.g., including processing circuitry) 210, a wireless communication circuit 220, a sensor 230, and/or a memory 240. According to an embodiment, the processor 210 may be substantially the same as the processor 120 of FIG. 1, or may be included in the processor 120. The wireless communication circuit 220 may be substantially the same as the wireless communication module 192 of FIG. 1, or may be included in the wireless communication module 192. The sensor 230 may be substantially the same as the sensor module 176 of FIG. 1, or may be included in the sensor module 176. The memory 240 may be substantially the same as the memory 130 of FIG. 1, or may be included in the memory 130.

According to various embodiments, the processor 210 may include various processing circuitry and control the wireless communication circuit 220, the sensor 230, and/or the memory 240 that are operatively connected. According to an embodiment, the processor 210 may include a communication processor (CP), an application processor (AP), or a sensor hub.

According to various embodiments, the processor 210 may communicate with a wireless communication network (e.g., a cellular network) through the wireless communication circuit 220. According to an embodiment, when the processor 210 does not provide a function related to wireless communication in a state of being connected to the network (e.g., a cell) (e.g., in a radio resource control (RRC) idle state), the processor 210 may control the wireless communication circuit 220 to periodically monitor paging of the network. For example, the processor 210 may determine a frame (e.g., a paging frame (PF)) related to a paging message and a period (e.g., a paging occasion (PO)) in which a paging message is transmitted, based on identification information (e.g., an international mobile station identity (IMSI)) about the electronic device 200 and a discontinuous reception (DRX) cycle. When the period (e.g., the PO) in which the paging message is transmitted periodically arrives, the processor 210 may activate the wireless communication circuit 220 to identify whether a paging message related to the electronic device 200 is received. For example, when the period (e.g., the PO) in which the paging message is transmitted arrives, the processor 210 may decode a paging-radio network temporary identifier (P-RNTI) received from the network via a physical downlink control channel (PDCCH) through the wireless communication circuit 220 to identify paging information. The processor 210 may identify whether the identification information (e.g., the IMSI) about the electronic device 200 is included in the paging information identified by decoding the P-RNTI. According to an embodiment, when receiving a paging message related to the electronic device 200 through paging monitoring, the processor 210 may control the wireless communication circuit 220 to perform an RRC reconnection procedure for wireless connection to the network. For example, when the identification information about the electronic device 200 exists in the paging information identified by decoding the P-RNTI, the processor 210 may determine that a paging message related to the electronic device 200 has been received.

According to various embodiments, when monitoring paging through the wireless communication circuit 220, the processor 210 may identify the state of a channel with the network. For example, the state of the channel may include a cell selection reception level (Srxlev) and/or a cell selection quality level (Squal). For example, the cell selection reception level may be configured based on reference signal received power (RSRP). For example, the cell selection quality level may be configured based on reference signal received quality (RSRQ).

According to various embodiments, when the state of the channel with the network satisfies a specified first condition, the processor 210 may determine that there is no cell accessible to the electronic device 200 (e.g., cell lost). According to an embodiment, when the state of the channel with the network satisfies the specified first condition, the processor 210 may determine that there is no cell on which the electronic device 200 may camp. For example, when the state of the channel with the network is continuously less than or equal to a reference value for a specified first time, the processor 210 may determine that the state of the channel with the network satisfies the specified first condition. In another example, when the state of the channel with the network is less than or equal to the reference value a specified number of times consecutively, the processor 210 may determine that the state of the channel with the network satisfies the specified first condition. For example, when determining that there is no cell on which the electronic device 200 may camp, the processor 210 may determine that cell reselection has failed.

According to various embodiments, when determining that there is no cell accessible to the electronic device 200, the processor 210 may identify a movement state of the electronic device 200. According to an embodiment, when determining that there is no cell accessible to the electronic device 200, the processor 210 may identify movement information about the electronic device 200 through the sensor 230. According to an embodiment, when determining that there is no cell accessible to the electronic device 200, the processor 210 may identify the state of a display (not shown) of the electronic device 200. For example, when the display is an inactive state, the processor 210 may identify the movement information about the electronic device 200 through the sensor 230. In another example, when the display is an active state, the processor 210 may control the wireless communication circuit 220 to perform cell search (or cell scan, cell retrieval). For example, when at least one accessible cell is searched through cell search, the processor 210 may perform a network registration procedure. In another example, when at least one accessible cell is not searched through cell search, the processor 210 may identify the movement information about the electronic device 200 through the sensor 230.

According to various embodiments, when determining that the electronic device 200 is in a first state (e.g., a stationary state), based on the movement information about the electronic device 200, the processor 210 may restrict cell search for a specified second time. According to an embodiment, when determining that the electronic device 200 is in the stationary state, based on the movement information about the electronic device 200, the processor 210 may determine that the electronic device 200 is continuously positioned in a service-restricted area. When the electronic device 200 is continuously positioned in the service-restricted area, the processor 210 may determine that there is a relatively low probability that another cell accessible to the electronic device 200 is searched through cell search, and may operate a timer that operates for the specified second time. According to an embodiment, when operation of the timer that operates for the specified second time is completed, the processor 210 may control the wireless communication circuit 220 to perform cell search according to a first period to identify whether there is a cell accessible to the electronic device 200. For example, the first period may be configured to a relatively longer period than a second period for cell search in a moving state. According to an embodiment, when the electronic device 200 is switched to a second state (e.g., the moving state) while performing cell search according to the first period, the processor 210 may control the wireless communication circuit 220 to change a cell search period to the second period relatively shorter than the first period. For example, the first state (e.g., the stationary state) may include a state in which the electronic device 200 stops in a specified area (or a specified position), based on the movement information about the electronic device 200.

According to various embodiments, when determining that the electronic device 200 is in the second state (e.g., the moving state), based on the movement information about the electronic device 200, the processor 210 may control the wireless communication circuit 220 to perform cell search. According to an embodiment, when determining that the electronic device 200 is in the moving state, based on the movement information about the electronic device 200, the processor 210 may determine that there is a relatively high probability that the electronic device 200 leaves the service-restricted area. When the electronic device 200 leaves the service-restricted area, the processor 210 may determine that there is a high probability that a cell accessible to the electronic device 200 is searched, and may control the wireless communication circuit 220 to perform cell search according to the second period. For example, the second period may be configured to a relatively shorter period than the first period for cell search in the stationary state. For example, the second state (e.g., the moving state) may include a state in which the electronic device 200 is moving from a first area (or first position) to a second area (or second position) different from the first area (or first position), based on the movement information about the electronic device 200.

According to various embodiments, when a cell accessible to the electronic device 200 is searched through cell search, the processor 210 may control the wireless communication circuit 220 to perform a network registration procedure with respect to the cell accessible to the electronic device 200. For example, the network registration procedure may include a registration procedure based on at least one of public land mobile network (PLMN) selection, cell selection, attach, or tracking area update (TAU).

According to various embodiments, when the electronic device 200 is in the first state (e.g., the stationary state), the processor 210 may restrict data transmission. According to an embodiment, when the electronic device 200 is in the first state (e.g., the stationary state), the processor 210 may restrict transmission of data generated in a background. For example, the data generated in the background may include ping data or data generated in an application for which a user notification is not configured among applications running in the background.

According to various embodiments, the wireless communication circuit 220 may transmit and/or receive a signal and/or data to and/or from the network (e.g., a base station or a transmission node). According to an embodiment, the wireless communication circuit 220 may perform cell search, based on the first period or the second period, under control of the processor 210. For example, when a cell search time arrives based on the first period or the second period, the wireless communication circuit 220 may be activated to perform cell search. For example, when cell search is completed, the wireless communication circuit 220 may be switched to the inactive state.

According to various embodiments, the sensor 230 may detect the movement state of the electronic device 200, and may provide detected information to the processor 210. According to an embodiment, the sensor 230 may include at least one of an inertial sensor, a motion sensor, a six-axis sensor, a gyro sensor, or an acceleration sensor for collecting information related to a movement of the electronic device 200.

According to various embodiments, the memory 240 may store various pieces of data used by at least one component (e.g., the processor 210, the wireless communication circuit 220, or the sensor 230) included in the electronic device 200. For example, the data may include information (e.g., the specified first condition) for determining whether there is a cell accessible to the electronic device 200. According to an embodiment, the memory 240 may store various instructions executable by the processor 210.

According to various embodiments, a wearable device (e.g., the electronic device 101 of FIG. 1 or the electronic device 200 of FIG. 2) may include a sensor (e.g., the sensor module 176 of FIG. 1 or the sensor 230 of FIG. 2), a wireless communication circuit (e.g., the wireless communication module 192 of FIG. 1 or the wireless communication circuit 220 of FIG. 2), and a communication processor (e.g., the processor 120 of FIG. 1 or the processor 210 of FIG. 2) configured to be operatively connected to the sensor and the wireless communication circuit, wherein the communication processor may be configured to identify a state of a channel in a state of being connected to a network through the wireless communication circuit, identify a movement state of the wearable device through the sensor when the state of the channel satisfies a specified condition related to connection restriction of the network, perform cell search according to a first period after a lapse of a specified first time when the wearable device is in a stationary state, and perform cell search according to a second period relatively shorter than the first period when the wearable device is in a moving state.

According to various embodiments, the communication processor may be configured to monitor paging of the network according to a third period negotiated with the network when a state of connection with the network is a radio resource control (RRC) idle state, and identify the state of the channel of the network according to the third period.

According to various embodiments, the communication processor may be configured to determine that the state of the channel satisfies the specified condition related to the connection restriction of the network when the state of the channel with the network is continuously less than or equal to a reference value for a specified second time.

According to various embodiments, the wearable device may further include a display, wherein the communication processor may be configured to identify whether the display is activated when the state of the channel satisfies the specified condition related to the connection restriction of the network, and identify the movement state of the wearable device through the sensor when the display is in an inactive state.

According to various embodiments, the communication processor may be configured to perform cell search when the display is in an active state, and identify the movement state of the wearable device through the sensor when a network accessible to the wearable device is not searched through the cell search.

According to various embodiments, the communication processor may be configured to perform a network registration procedure, based on the searched network accessible to the wearable device, when the network is searched through the cell search.

According to various embodiments, the wearable device may further include an application processor, wherein the communication processor may be configured to transmit information related to restriction of data transmission to the application processor when the wearable device is in the stationary state, and the application processor may be configured to restrict a function of data transmission to an external device, based on the information related to the restriction of the data transmission.

According to various embodiments, the communication processor may be configured to operate a timer that operates for the specified first time when the wearable device is in the stationary state, and perform cell search, based on the first period, when operation of the timer expires.

According to various embodiments, the communication processor may be configured to identify whether the movement state of the wearable device is switched when cell search is performed based on the first period, and change the cell search period from the first period to the second period when the movement state of the wearable device is switched to the moving state.

According to various embodiments, the communication processor may be configured to perform a network registration procedure, based on the searched network accessible to the wearable device when the network is searched through the cell search based on the first period or the second period.

Figure 3:
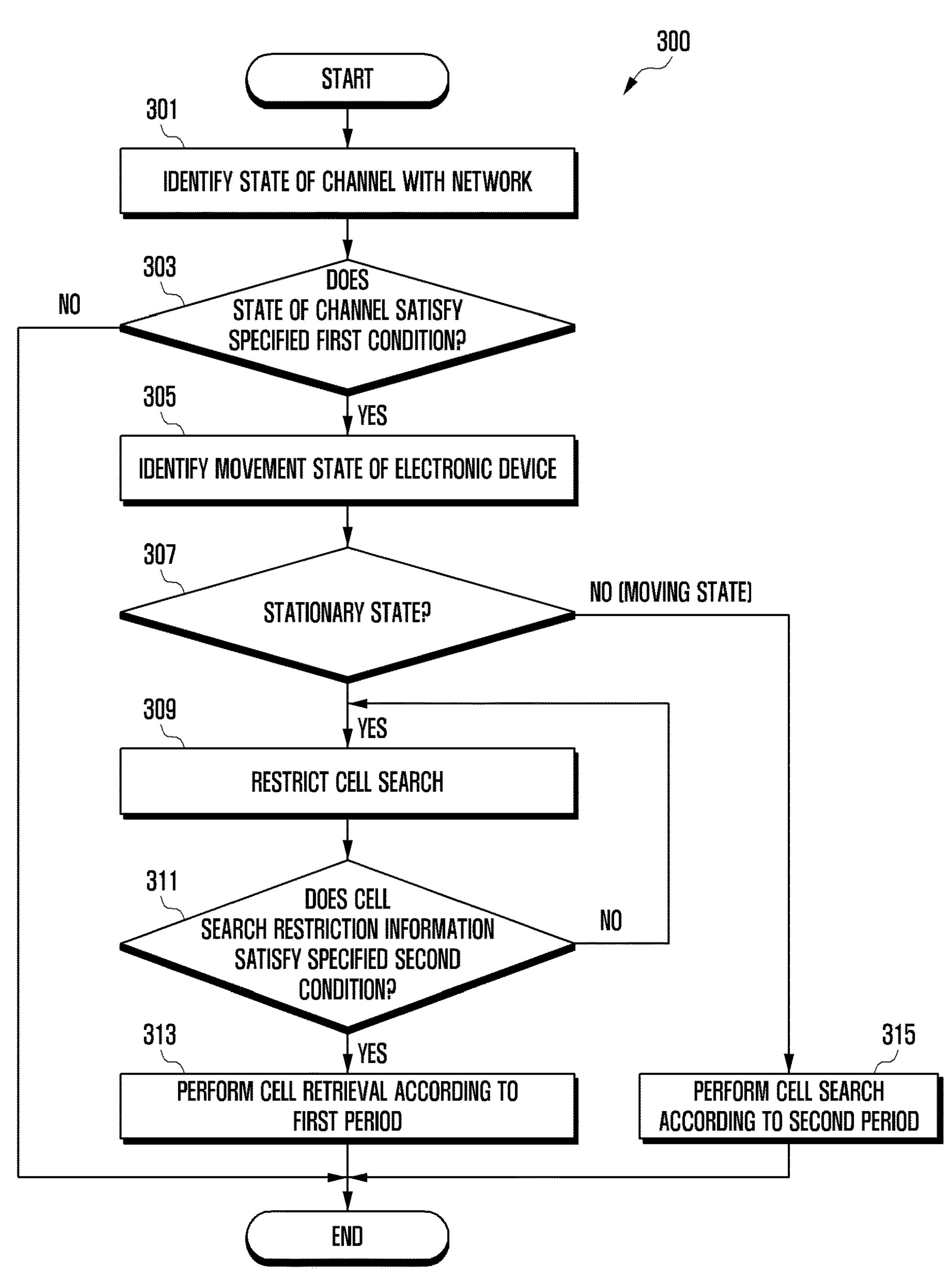
FIG. 3 is a flowchart for performing cell search in an electronic device according to an embodiment of the disclosure.

FIG. 3 is a flowchart for performing cell search in an electronic device according to an embodiment of the disclosure. In the following embodiments, operations may be sequentially performed, but are not necessarily performed sequentially. For example, the operations may be performed in a different order, or at least two operations may be performed in parallel. For example, the electronic device of FIG. 3 may be the electronic device 101 of FIG. 1 or the electronic device 200 of FIG. 2.

Referring to FIG. 3, depicting flowchart 300, according to various embodiments, in operation 301, the electronic device (e.g., the processor 120 of FIG. 1 or the processor 210 of FIG. 2) may identify the state of a channel with a network (e.g., a base station or a transmission node) to which the electronic device is connected. According to an embodiment, the processor 210 may connect to the network through a wireless communication circuit 220. When the processor 210 does not provide a function related to wireless communication in a state of being connected to the network (e.g., a cell) (e.g., in an RRC idle state), the processor 210 may control the wireless communication circuit 220 to periodically monitor paging of the network. The processor 210 may identify the state of the channel with the network through the wireless communication circuit 220 at a time of monitoring paging of the network. For example, the state of the channel may include a cell selection reception level (Srxlev) and/or a cell selection quality level (Squal). For example, the cell selection reception level may be configured based on RSRP. For example, the cell selection quality level may be configured based on RSRQ.

According to various embodiments, in operation 303, the electronic device (e.g., the processor 120 or 210) may identify whether the state of the channel with the network satisfies a specified first condition. According to an embodiment, when the state of the channel with the network that is periodically identified is less than or equal to a reference value a specified number of times consecutively, the processor 210 may determine that the state of the channel with the network satisfies the specified first condition. According to an embodiment, when the state of the channel with the network that is periodically identified is continuously less than or equal to the reference value for a specified first time, the processor 210 may determine that the state of the channel with the network satisfies the specified first condition.

According to various embodiments, when the state of the channel with the network does not satisfy the specified first condition (e.g., "No" in operation 303), the electronic device (e.g., the processor 120 or 210) may terminate an embodiment for performing cell search (or cell scan).

According to various embodiments, when the state of the channel with the network satisfies the specified first condition (e.g., "Yes" in operation 303), the electronic device (e.g., the processor 120 or 210) may identify a movement state of the electronic device 200 in operation 305. According to an embodiment, when the state of the channel with the network satisfies the specified first condition, the processor 210 may determine that there is no cell on which the electronic device 200 may camp. For example, a state in which there is no cell on which the electronic device 200 may camp may include a state in which cell reselection of the electronic device 200 has failed. According to an embodiment, when determining that there is no cell on which the electronic device 200 may camp, the processor 210 may identify movement information about the electronic device 200 through the sensor 230.

According to various embodiments, in operation 307, the electronic device (e.g., the processor 120 or 210) may determine whether the movement state of the electronic device 200 is a stationary state. For example, the stationary state may include a state in which the electronic device 200 stops in a specified area (or a specified position), based on the movement information about the electronic device 200.

According to various embodiments, when the movement state of the electronic device 200 is in the stationary state (e.g., "Yes" in operation 307), the electronic device (e.g., the processor 120 or 210) may restrict cell search to identify whether there is a cell accessible to the electronic device 200 in operation 309. According to an embodiment, when the electronic device 200 is in the stationary state, the processor 210 may determine that the electronic device 200 is continuously positioned in a service-restricted area and thus there is a relatively low probability that another cell accessible to the electronic device 200 is searched through cell search. When determining that cell search is unnecessary, the processor 210 may operate a timer that operates for a specified second time. For example, the processor 210 may restrict cell search to identify whether there is a cell accessible to the electronic device 200 while the timer is operating.

According to various embodiments, in operation 311, the electronic device (e.g., the processor 120 or 210) may identify whether cell search restriction information satisfies a specified second condition. According to an embodiment, the processor 210 may identify whether the timer operated to restrict cell search expires.

According to various embodiments, when the cell search restriction information does not satisfy the specified second condition (e.g., "No" in operation 311), the electronic device (e.g., the processor 120 or 210) may restrict cell search in operation 309. According to an embodiment, when the timer operated to restrict cell search is operating, the processor 210 may determine that the cell search restriction information does not satisfy the specified second condition. When the timer is operating, the processor 210 may restrict cell search to identify whether there is a cell accessible to the electronic device 200.

According to various embodiments, when the cell search restriction information satisfies the specified second condition (e.g., "Yes" in operation 311), the electronic device (e.g., the processor 120 or 210) may perform cell search, based on a first period in operation 313. According to an embodiment, when the timer operated to restrict cell search expires, the processor 210 may determine that the cell search restriction information satisfies the specified second condition. When operation of the timer expires, the processor 210 may perform cell search to identify whether there is a cell accessible to the electronic device 200. For example, the processor 210 may control the wireless communication circuit 220 to perform cell search, based on the first period configured to be relatively long.

According to various embodiments, when the movement state of the electronic device 200 is a moving state (e.g., "No" in operation 307), the electronic device (e.g., the processor 120 or 210) may perform cell search, based on a second period configured to be relatively shorter than the first period in operation 315. According to an embodiment, when the electronic device 200 is in the moving state, the processor 210 may determine that there is a high probability that the electronic device 200 leaves the service-restricted area and thus a cell accessible to the electronic device 200 is searched. In this case, the processor 210 may control the wireless communication circuit 220 to perform cell search according to the second period in order to search a cell to which the electronic device 200 connects. For example, the moving state may include a state in which the electronic device 200 is moving from a first area (or first position) to a second area (or second position) different from the first area (or first position), based on the movement information about the electronic device 200.

According to various embodiments, when performing cell search according to the first period, the electronic device 200 may change a cell search period, based on the movement state of the electronic device 200. According to an embodiment, when the movement state of the electronic device 200 is switched to the moving state while performing cell search according to the first period, the processor 210 may control the wireless communication circuit 220 to change the cell search period to the second period relatively shorter than the first period.

According to various embodiments, when a cell accessible to the electronic device 200 is searched through cell search according to the first period or the second period, the electronic device 200 may perform a network registration procedure, based on the cell accessible to the electronic device 200.

Figure 4:
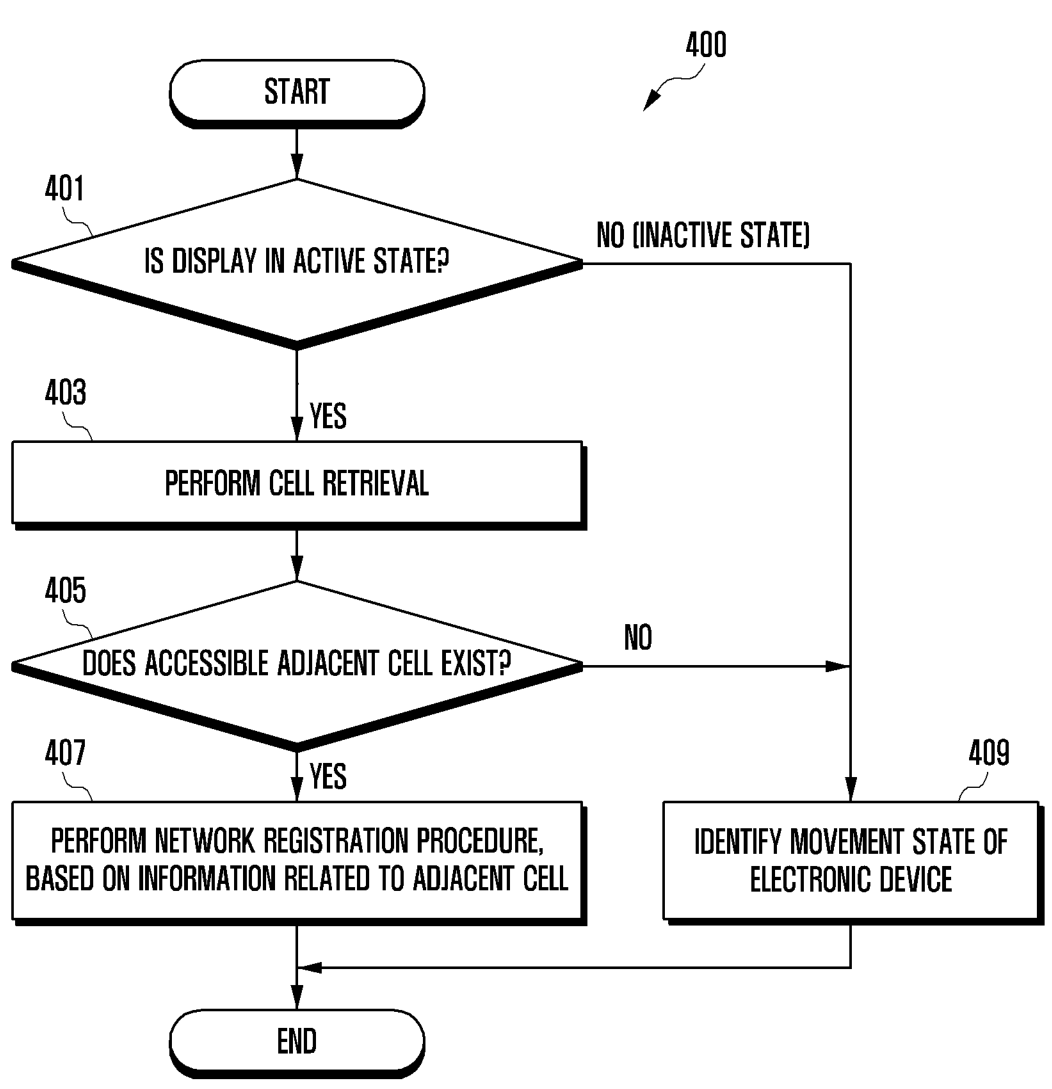
FIG. 4 is a flowchart for performing cell search, based on an active state of a display in an electronic device according to an embodiment of the disclosure.

FIG. 4 is a flowchart for performing cell search, based on an active state of a display in an electronic device according to an embodiment of the disclosure. According to an embodiment, operations of FIG. 4 may be detailed operations of operation 305 of FIG. 3. In the following embodiments, the operations may be sequentially performed, but are not necessarily performed sequentially. For example, the operations may be performed in a different order, or at least two operations may be performed in parallel. For example, the electronic device of FIG. 4 may be the electronic device 101 of FIG. 1 or the electronic device 200 of FIG. 2.

Referring to FIG. 4 depicting flowchart 400, according to various embodiments, when the state of a channel with a network satisfies a specified first condition (e.g., "Yes" in operation 303), the electronic device (e.g., the processor 120 of FIG. 1 or the processor 210 of FIG. 2) may identify whether a display (not shown) of the electronic device 200 is in an active state in operation 401. According to an embodiment, when determining that there is no cell on which the electronic device 200 may camp, based on the state of the channel with the network, the processor 210 may identify whether the display (not shown) of the electronic device 200 is in the active state.

According to various embodiments, when the display is in the active state (e.g., "Yes" in operation 401), the electronic device (e.g., the processor 120 or 210) may perform cell search in operation 403. According to an embodiment, when the display of the electronic device 200 is in the active state, the processor 210 may determine that a user is using the electronic device 200. That is, the processor 210 may determine that there is a relatively high probability that the user uses a function related to wireless communication of the electronic device 200. Accordingly, the processor 210 may control a wireless communication circuit 220 to perform cell search to determine whether there is a cell accessible to the electronic device 200.

According to various embodiments, in operation 405, the electronic device (e.g., the processor 120 or 210) may determine whether there is an adjacent cell accessible to the electronic device 200, based on a cell search result.

According to various embodiments, when there is an adjacent cell accessible to the electronic device 200 (e.g., "Yes" in operation 405), the electronic device (e.g., the processor 120 or 210) may perform a network registration procedure, based on information related to the adjacent cell in operation 407. For example, the network registration procedure may include a registration procedure based on at least one of public land mobile network (PLMN) selection, cell selection, attach, or tracking area update (TAU).

According to various embodiments, when the display is not in the active state (e.g., "No" in operation 401) or when there is no adjacent cell accessible to the electronic device 200 (e.g., "No" in operation 405), the display of the electronic device (e.g., the processor 120 or 210) may identify a movement state of the electronic device 200 in operation 409. According to an embodiment, when the display of the electronic device 200 is in an inactive state, the processor 210 may determine that the user is not using the electronic device 200. That is, the processor 210 may determine that there is a relatively low probability that the user uses the function related to wireless communication of the electronic device 200. Accordingly, the processor 210 may identify the movement state of the electronic device 200, based on sensor data obtained by a sensor 230 to determine whether cell search is delayed. According to an embodiment, when there is no adjacent cell accessible to the electronic device 200, the processor 210 may determine that the electronic device 200 is unable to provide the function related to wireless communication. Accordingly, the processor 210 may identify the movement state of the electronic device 200, based on the sensor data obtained by the sensor 230 to determine whether cell search is delayed.

Figure 5:
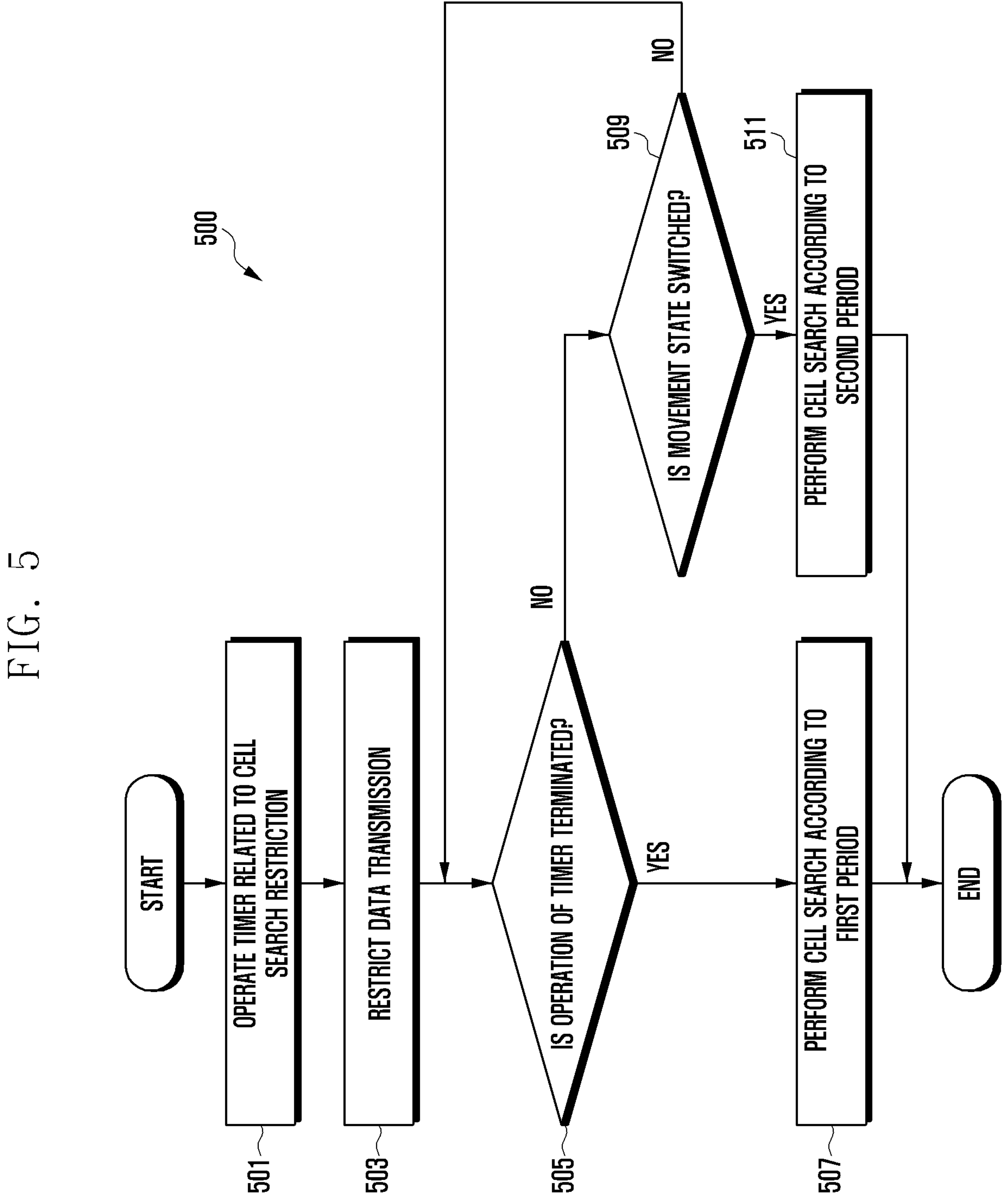
FIG. 5 is a flowchart for delaying cell search in an electronic device according to an embodiment of the disclosure.

FIG. 5 is a flowchart for delaying cell search in an electronic device according to an embodiment of the disclosure. According to an embodiment, operations of FIG. 5 may be detailed operations of 309, 311, and 313 of FIG. 3. In the following embodiments, the operations may be sequentially performed, but are not necessarily performed sequentially. For example, the operations may be performed in a different order, or at least two operations may be performed in parallel. For example, the electronic device of FIG. 5 may be the electronic device 101 of FIG. 1 or the electronic device 200 of FIG. 2.

Referring to FIG. 5, depicting flowchart 500, according to various embodiments, when a movement state of the electronic device 200 is a stationary state (e.g., "Yes" in operation 307), the electronic device (e.g., the processor 120 of FIG. 1 or the processor 210 of FIG. 2) may operate a timer related to restriction of cell search in operation 501. According to an embodiment, the processor 210 may operate a timer that operates for a specified second time to restrict cell search.

According to various embodiments, in operation 503, the electronic device (e.g., the processor 120 or 210) may restrict transmission of data generated in the electronic device 200. According to an embodiment, when the electronic device 200 is in the stationary state, the processor 210 may restrict transmission of data generated in a background. For example, the data generated in the background may include ping data or data generated in an application for which a user notification is not configured among applications running in the background.

According to various embodiments, in operation 505, the electronic device (e.g., the processor 120 or 210) may determine whether operation of the timer related to the restriction of cell search is terminated. According to an embodiment, the processor 210 may identify whether an operating time of the timer expires.

According to various embodiments, when the operation of the timer related to the restriction of cell search is terminated (e.g., "Yes" in operation 505), the electronic device (e.g., the processor 120 or 210) may perform cell search, based on a first period in operation 507. According to an embodiment, when the operation of the timer operated to restrict cell search expires, the processor 210 may control a wireless communication circuit 220 to perform cell search, based on the first period configured to be relatively long, to identify whether there is a cell accessible to the electronic device 200.

According to various embodiments, when the operation of the timer related to the restriction of cell search is not terminated (e.g., "No" in operation 505), the electronic device (e.g., the processor 120 or 210) may identify whether the movement state of the electronic device 200 is changed to a moving state in operation 509.

According to various embodiments, when the movement state of the electronic device 200 is not changed to the moving state (e.g., "No" in operation 509), the electronic device (e.g., the processor 120 or 210) may identify whether the operation of the timer related to the restriction of cell search is not terminated in operation 505.

According to various embodiments, when the movement state of the electronic device 200 is changed to the moving state (e.g., "Yes" in operation 509), the electronic device (e.g., the processor 120 or 210) may perform cell search, based on a second period configured to be relatively shorter than the first period in operation 511.

Figure 6:
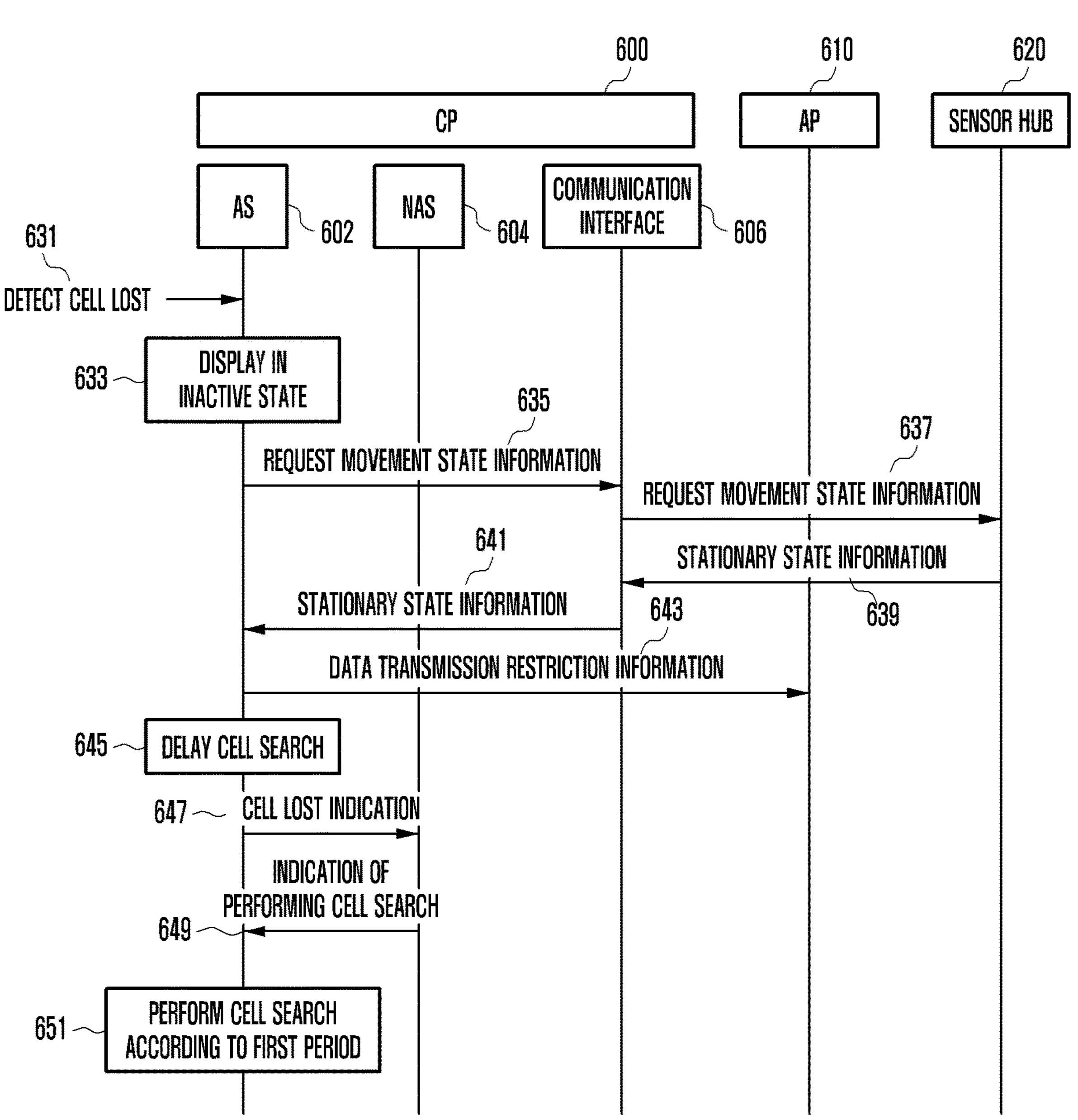
FIG. 6 illustrates an example of delaying cell search, based on a stationary state in an electronic device according to an embodiment of the disclosure.

FIG. 6 illustrates an example of delaying cell search, based on a stationary state in an electronic device according to an embodiment of the disclosure.

Referring to FIG. 6, according to various embodiments, the electronic device 200 may include a communication processor (CP) 600, an application processor (AP) 610, and a sensor hub 620.

According to various embodiments, when the state of a channel with a network satisfies a specified first condition, an access stratum (AS) 602 of the communication processor 600 may determine that there is no cell accessible to the electronic device 200 (e.g., cell lost) in operation 631. For example, the state of the channel may include a cell selection reception level (Srxlev) configured based on RSRP and/or a cell selection quality level (Squal) configured based on RSRQ.

According to various embodiments, when a display of the electronic device 200 is in an inactive state in operation 633, the AS 602 of the communication processor 600 may request movement state information from the sensor hub 620 through a communication interface 606 in operations 635 and 637. According to an embodiment, the communication processor 600 may obtain state information about the display through the application processor 610 or the sensor hub 620. The AS 602 may identify whether the display is in the inactive state, based on the state information about the display obtained by the communication processor 600 through the application processor 610 or the sensor hub 620. According to an embodiment, the communication processor 600 and the sensor hub 620 may perform communication in a universal asynchronous receiver/transmitter (UART) mode. According to an embodiment, the communication processor 600 and the sensor hub 620 may perform communication using a shared memory method.

According to various embodiments, when receiving a request for the movement state information from the communication processor 600, the sensor hub 620 may identify a movement state (e.g., a stationary state or a moving state) of the electronic device 200, based on sensor data provided from a sensor 230 of the electronic device 200.

According to various embodiments, when the electronic device 200 is in the stationary state, the sensor hub 620 may transmit information related to the stationary state to the AS 602 through the communication interface 606 of the communication processor 600 in operations 639 and 641.

According to various embodiments, the AS 602 of the communication processor 600 may transmit data transmission restriction information to the application processor 610 to restrict data transmission of the electronic device 200, based on the stationary state of the electronic device 200 in operation 643. According to an embodiment, the application processor 610 may restrict transmission of background data, based on the data transmission restriction information.

According to various embodiments, the AS 602 of the communication processor 600 may restrict cell search to identify whether there is a cell accessible to the electronic device 200, based on the stationary state of the electronic device 200 In operation 645. According to an embodiment, the AS 602 may start a timer that operates for a specified second time to restrict the cell search.

According to various embodiments, when operation of the timer expires, the AS 602 of the communication processor 600 may transmit information (e.g., a cell lost indication) indicating that there is no cell accessible to the electronic device 200 to a non-access stratum (NAS) 604 in operation 647.

According to various embodiments, the NAS 604 of the communication processor 600 may determine, based on the information indicating that there is no cell accessible to the electronic device 200, that cell search is needed to identify whether there is a cell accessible to the electronic device 200. The NAS 604 may transmit indication information related to performing cell search to the AS 602 in operation 649.

According to various embodiments, the AS 602 of the communication processor 600 may perform cell search according to a first period, based on the indication information related to performing the cell search in operation 651. For example, the first period may include a relatively long period configured based on the stationary state of the electronic device 200.

According to various embodiments, the communication processor 600 may receive information related to the movement state of the electronic device 200 from the sensor hub 620 through the application processor 610.

Figure 7:
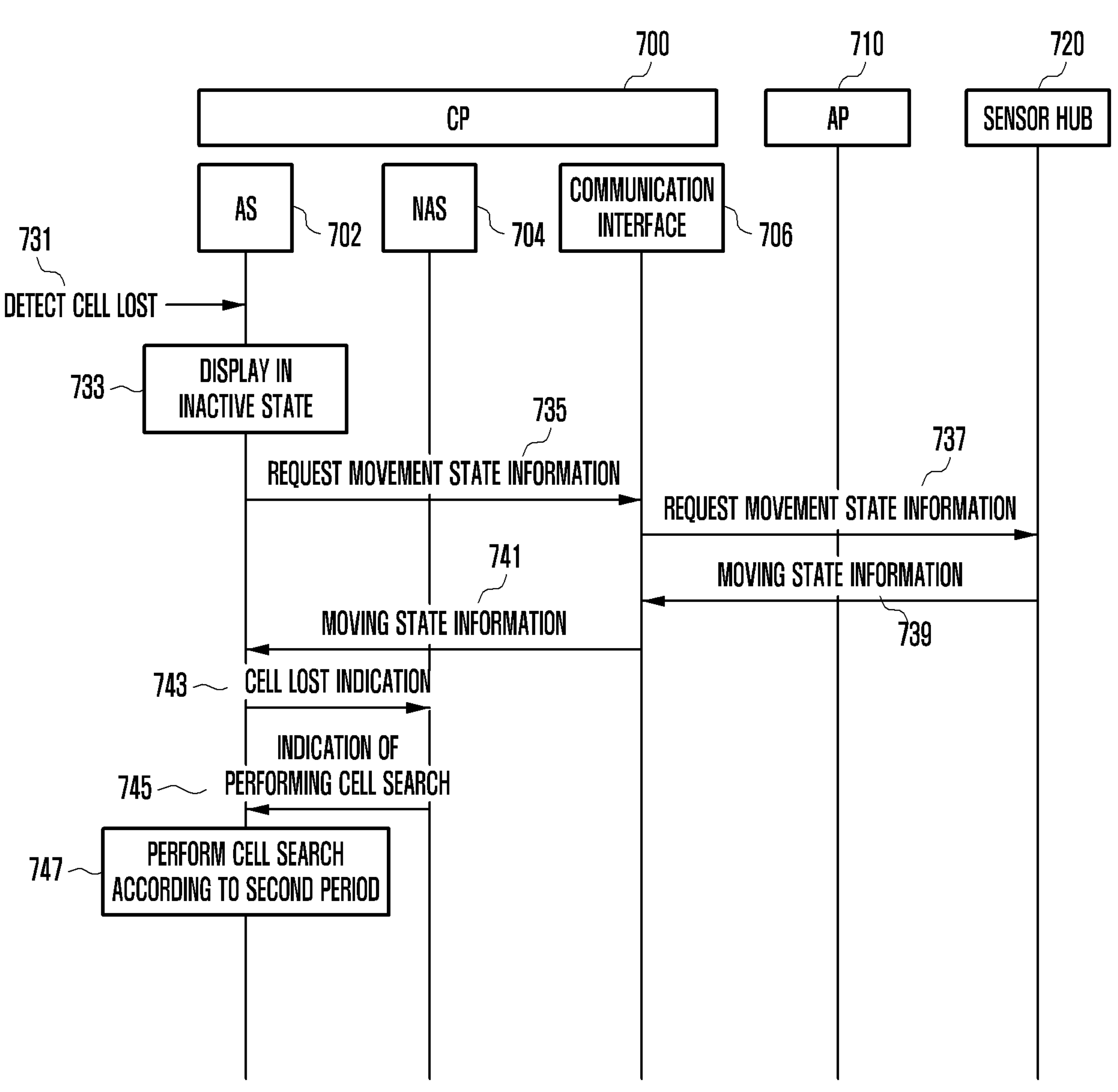
FIG. 7 illustrates an example of performing cell search, based on a moving state in an electronic device according to an embodiment of the disclosure.

FIG. 7 illustrates an example of performing cell search, based on a moving state in an electronic device according to an embodiment of the disclosure.

Referring to FIG. 7, according to various embodiments, when the state of a channel with a network satisfies a specified first condition, an AS 702 of a communication processor 700 may determine that there is no cell accessible to the electronic device 200 (e.g., cell lost) in operation 731.

According to various embodiments, when a display of the electronic device 200 is in an inactive state in operation 733, the AS 702 of the communication processor 700 may request movement state information from a sensor hub 720 through a communication interface 706 in operations 735 and 737. According to an embodiment, the communication processor 700 may obtain state information about the display through an application processor 710 or the sensor hub 720. The AS 702 may identify whether the display is in the inactive state, based on the state information about the display obtained by the communication processor 700 through the application processor 710 or the sensor hub 720.

According to various embodiments, when receiving a request for the movement state information from the communication processor 700, the sensor hub 720 may identify a movement state (e.g., a stationary state or a moving state) of the electronic device 200, based on sensor data provided from a sensor 230 of the electronic device 200.

According to various embodiments, when the electronic device 200 is in a moving state, the sensor hub 720 may transmit information related to the moving state to the AS 702 through the communication interface 706 of the communication processor 700 in operations 739 and 741.

According to various embodiments, the AS 702 of the communication processor 700 may transmit information (e.g., a cell lost indication) indicating that there is no cell accessible to the electronic device 200 to an NAS 604, based on the moving state of the electronic device 200 in operation 743.

According to various embodiments, the NAS 704 of the communication processor 700 may determine, based on the information indicating that there is no cell accessible to the electronic device 200, that cell search is needed to identify whether there is a cell accessible to the electronic device 200. The NAS 704 may transmit indication information related to performing cell search to the AS 702 in operation 745.

According to various embodiments, the AS 702 of the communication processor 700 may perform cell search according to a second period, based on the indication information related to performing the cell search in operation 747. For example, the second period may include a relatively short period configured based on the moving state of the electronic device 200.

According to various embodiments, when the movement state of the electronic device 200 is changed, the sensor hub 720 may transmit information related to the movement state of the electronic device 200 to the communication processor 700.

According to various embodiments, the sensor hub 720 may periodically transmit the information related to the movement state of the electronic device 200 to the communication processor 700, based on a request for the movement state.

Figure 8:
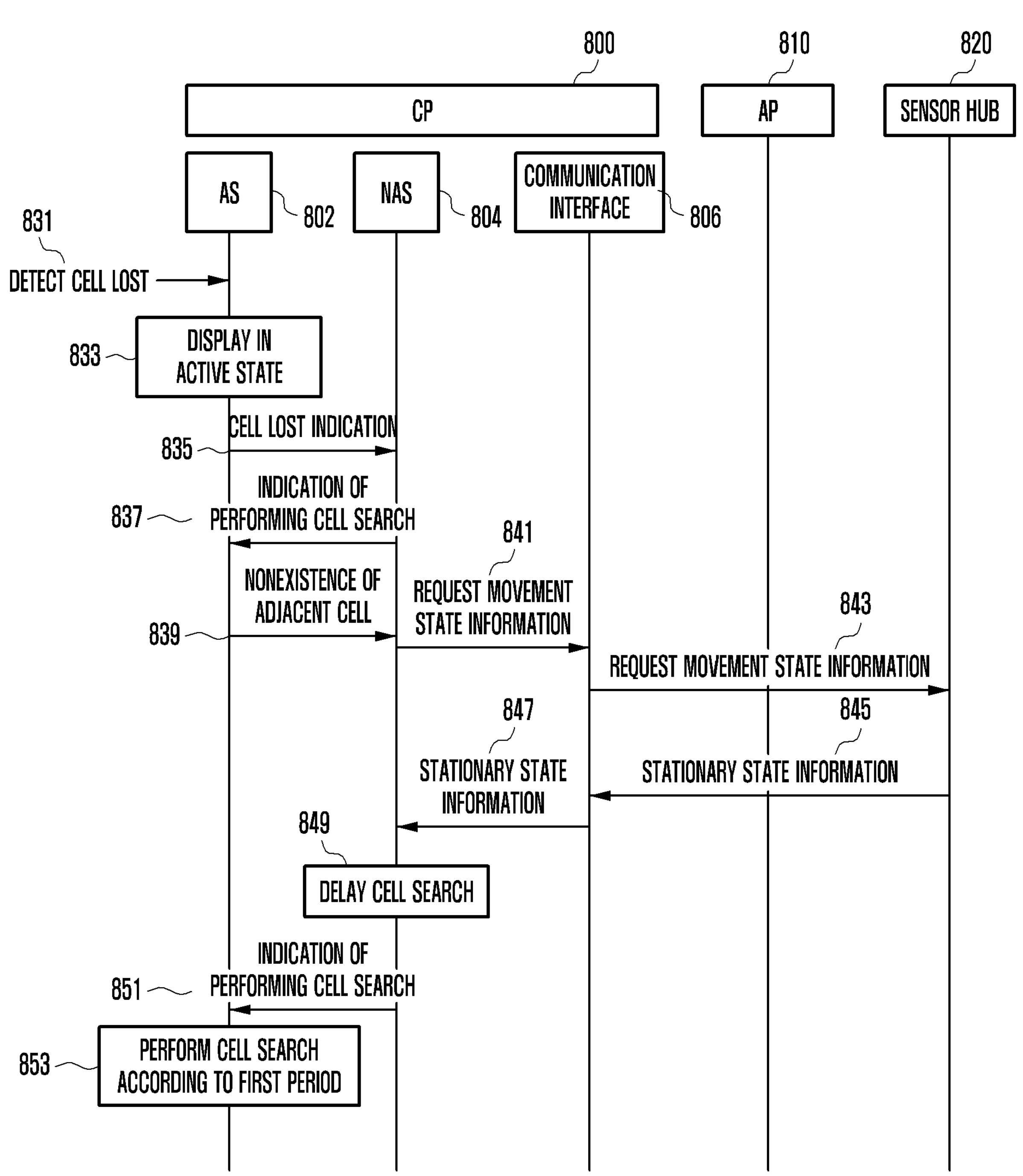
FIG. 8 illustrates another example of delaying cell search, based on a stationary state in an electronic device according to an embodiment of the disclosure.

FIG. 8 illustrates another example of delaying cell search, based on a stationary state in an electronic device according to an embodiment of the disclosure.

Referring to FIG. 8, according to various embodiments, when the state of a channel with a network satisfies a specified first condition, an AS 802 of a communication processor 800 may determine that there is no cell accessible to the electronic device 200 (e.g., cell lost) in operation 831.

According to various embodiments, when a display of the electronic device 200 is in an active state in operation 833, the AS 802 of the communication processor 800 may transmit information (e.g., a cell lost indication) indicating that there is no cell accessible to the electronic device 200 to an NAS 804 in operation 835. According to an embodiment, the communication processor 800 may obtain state information about the display through an application processor 810 or a sensor hub 820. The AS 802 may identify whether the display is in the active state, based on the state information about the display obtained by the communication processor 800 through the application processor 810 or the sensor hub 820.

According to various embodiments, the NAS 804 of the communication processor 800 may determine, based on the information indicating that there is no cell accessible to the electronic device 200, that cell search is needed to identify whether there is a cell accessible to the electronic device 200. The NAS 804 may transmit indication information related to performing cell search to the AS 802 in operation 837.

According to various embodiments, the AS 802 of the communication processor 800 may perform cell search, based on the indication information related to performing the cell search. According to an embodiment, when there is no adjacent cell accessible to the electronic device 200 as a result of the cell search, the AS 802 may transmit information related to nonexistence of an adjacent cell to the NAS 804 in operation 839.

According to various embodiments, the NAS 804 of the communication processor 800 may request movement state information from the sensor hub 820 through a communication interface 806, based on the information related to the nonexistence of the adjacent cell in operations 841 and 843.

According to various embodiments, when receiving a request for the movement state information from the communication processor 800, the sensor hub 820 may identify a movement state (e.g., a stationary state or a moving state) of the electronic device 200, based on sensor data provided from a sensor 230 of the electronic device 200.

According to various embodiments, when the electronic device 200 is in the stationary state, the sensor hub 820 may transmit information related to the stationary state to the NAS 804 through the communication interface 806 of the communication processor 800 in operations 845 and 847.

According to various embodiments, the NAS 804 of the communication processor 800 may restrict cell search to identify whether there is a cell accessible to the electronic device 200, based on the stationary state of the electronic device 200 in operation 849. According to an embodiment, the NAS 804 may start a timer that operates for a specified second time to restrict the cell search.

According to various embodiments, when operation of the timer expires, the NAS 804 of the communication processor 800 may transmit indication information related to performing cell search to the AS 802 in operation 851.

According to various embodiments, the AS 802 of the communication processor 800 may perform cell search according to a first period, based on the indication information related to performing the cell search in operation 853. For example, the first period may include a relatively long period configured based on the stationary state of the electronic device 200.

According to various embodiments, the NAS 804 of the communication processor 800 may transmit data transmission restriction information to the application processor 810 to restrict data transmission of the electronic device 200, based on the stationary state of the electronic device 200. According to an embodiment, the application processor 810 may restrict transmission of background data, based on the data transmission restriction information.

Figure 9:
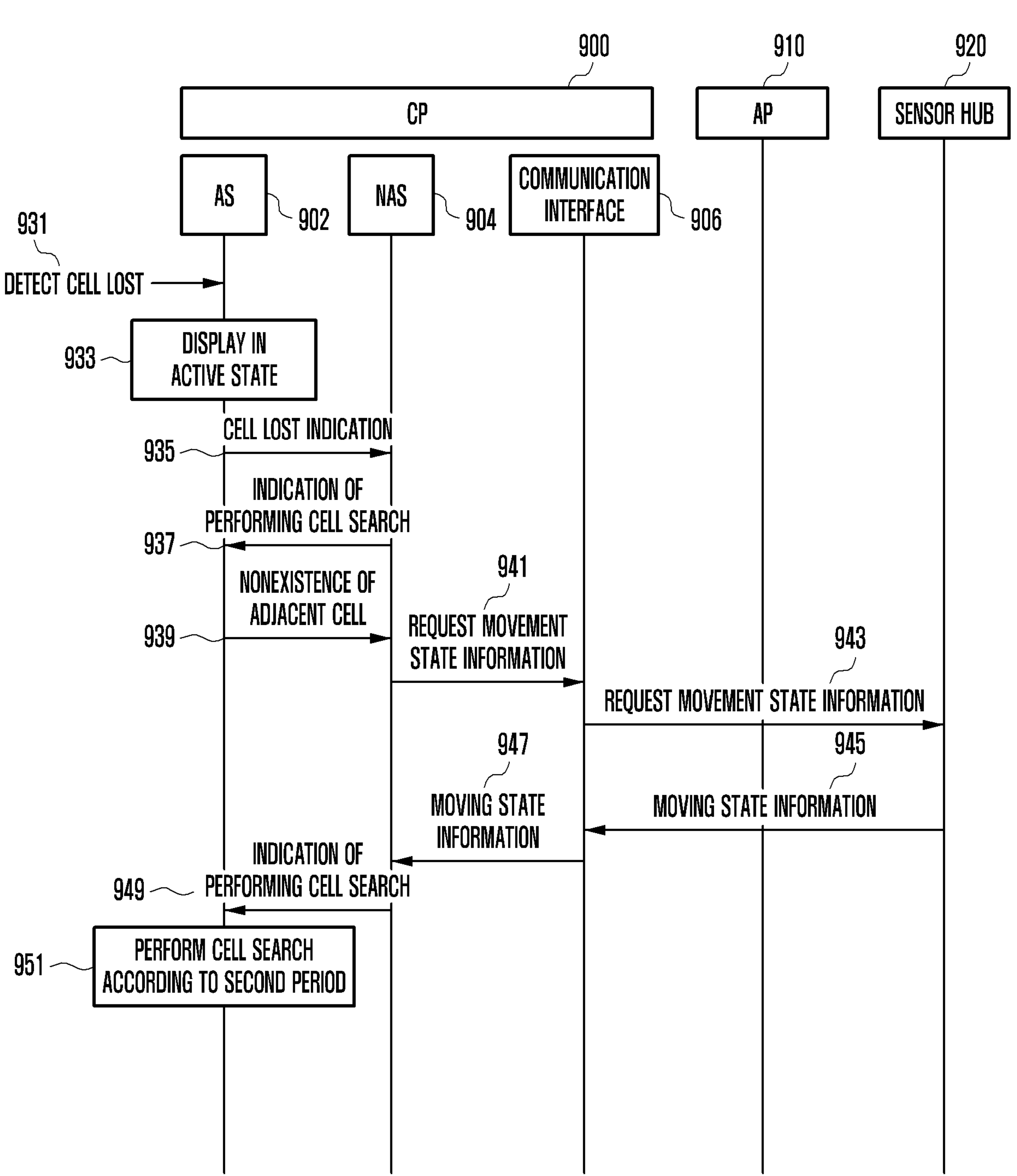
FIG. 9 illustrates another example of performing cell search, based on a moving state in an electronic device according to an embodiment of the disclosure.

FIG. 9 illustrates another example of performing cell search, based on a moving state in an electronic device according to an embodiment of the disclosure.

Referring to FIG. 9, according to various embodiments, when the state of a channel with a network satisfies a specified first condition, an AS 902 of a communication processor 900 may determine that there is no cell accessible to the electronic device 200 (e.g., cell lost) in operation 931.

According to various embodiments, when a display of the electronic device 200 is in an active state in operation 933, the AS 902 of the communication processor 900 may transmit information (e.g., a cell lost indication) indicating that there is no cell accessible to the electronic device 200 to an NAS 904 in operation 935. According to an embodiment, the communication processor 900 may obtain state information about the display through an application processor 910 or a sensor hub 920. The AS 902 may identify whether the display is in the active state, based on the state information about the display obtained by the communication processor 900 through the application processor 910 or the sensor hub 920.

According to various embodiments, the NAS 904 of the communication processor 900 may determine, based on the information indicating that there is no cell accessible to the electronic device 200, that cell search is needed to identify whether there is a cell accessible to the electronic device 200. The NAS 904 may transmit indication information related to performing cell search to the AS 902 in operation 937.

According to various embodiments, the AS 902 of the communication processor 900 may perform cell search, based on the indication information related to performing the cell search. According to an embodiment, when there is no adjacent cell accessible to the electronic device 200 as a result of the cell search, the AS 902 may transmit information related to nonexistence of an adjacent cell to the NAS 904 in operation 939.

According to various embodiments, the NAS 904 of the communication processor 900 may request movement state information from the sensor hub 920 through a communication interface 906, based on the information related to the nonexistence of the adjacent cell in operations 941 and 943.

According to various embodiments, when receiving a request for the movement state information from the communication processor 900, the sensor hub 920 may identify a movement state (e.g., a stationary state or a moving state) of the electronic device 200, based on sensor data provided from a sensor 230 of the electronic device 200.

According to various embodiments, when the electronic device 200 is in the moving state, the sensor hub 920 may transmit information related to the moving state to the NAS 904 through the communication interface 906 of the communication processor 900 in operations 945 and 947.

According to various embodiments, the NAS 904 of the communication processor 900 may transmit indication information related to performing cell search to the AS 902, based on the moving state of the electronic device 200 in operation 949.

According to various embodiments, the AS 902 of the communication processor 900 may perform cell search according to a second period, based on the indication information related to performing the cell search in operation 951. For example, the second period may include a relatively short period configured based on the moving state of the electronic device 200.

According to various embodiments, when there is an adjacent cell accessible to the electronic device 200 as a result of the cell search, the AS 902 of the communication processor 900 may transmit information related to the adjacent cell to the NAS 904.

According to various embodiments, the NAS 904 of the communication processor 900 may perform a network registration procedure of the electronic device 200, based on the information related to the adjacent cell.

Figure 10:
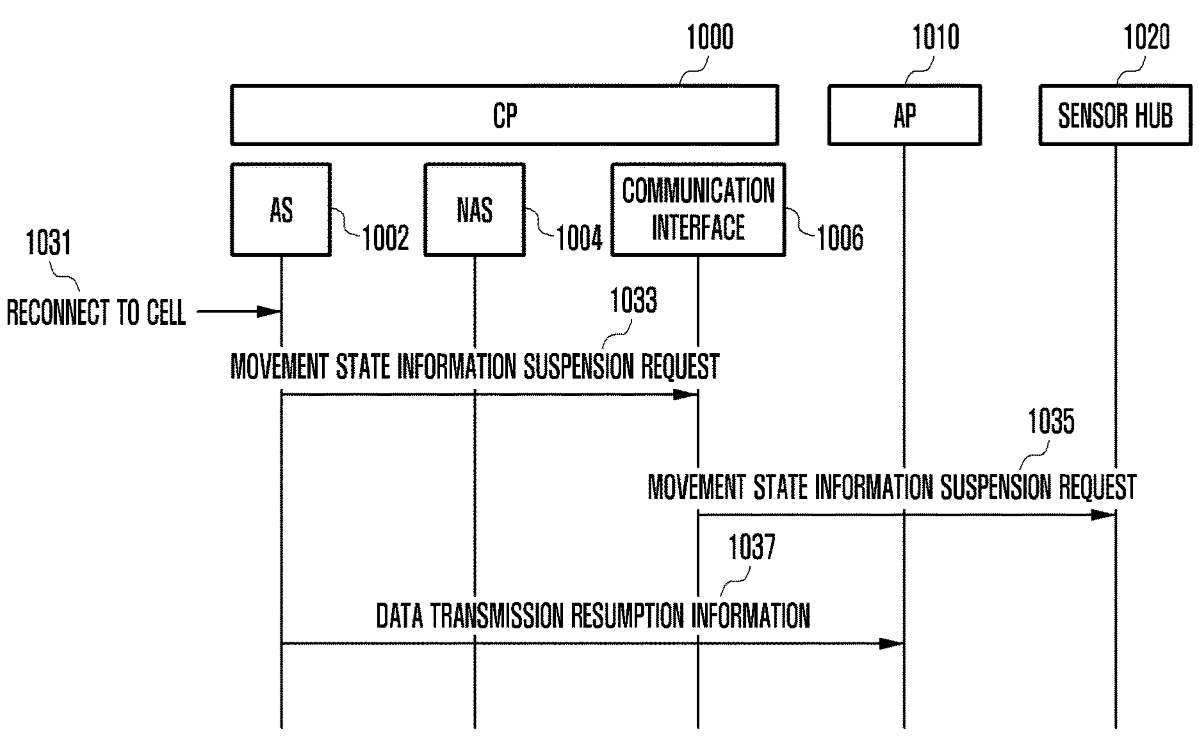
FIG. 10 illustrates an example of performing cell reconnection in an electronic device according to an embodiment of the disclosure.

FIG. 10 illustrates an example of performing cell reconnection in an electronic device according to an embodiment of the disclosure. For example, a communication processor 1000 may include an AS 1002 and a NAS 1004.

Referring to FIG. 10, according to various embodiments, when the electronic device 200 is reconnected to a cell in operation 1031, the AS 1002 of the communication processor 1000 may transmits a movement state information suspension request to a sensor hub 1020 through a communication interface 1006 in operations 1033 and 1035. According to an embodiment, a reconnected state of the cell may include a state in which a channel state of a network in an area where the electronic device 200 is positioned is improved or a state in which the electronic device 200 moves to a serviceable area and is reconnected to another cell.

According to various embodiments, the sensor hub 1020 may stop transmission of information about a movement state of the electronic device 200, based on the movement state information suspension request.

According to various embodiments, the AS 1002 of the communication processor 1000 may transmit data transmission resumption information to an application processor 1010 to resume data transmission of the electronic device 200, based on reconnection of the electronic device 200 to the cell in operation 1037. According to an embodiment, the application processor 1010 may resume transmission of background data, based on the data transmission resumption information.

According to various embodiments, an operating method of a wearable device (e.g., the electronic device 101 of FIG. 1 or the electronic device 200 of FIG. 2) may include identifying a state of a channel of a network in a state of being connected to the network, identifying a movement state of the wearable device when the state of the channel satisfies a specified condition related to connection restriction of the network, performing cell search according to a first period after a lapse of a specified first time when the wearable device is in a stationary state, and performing cell search according to a second period relatively shorter than the first period when the wearable device is in a moving state.

According to various embodiments, the identifying of the state of the channel may include monitor paging of the network according to a third period negotiated with the networking when a state of connection with the network is a radio resource control (RRC) idle state, and identifying the state of the channel of the network according to the third period.

According to various embodiments, the identifying of the movement state of the wearable device may include identifying the movement state of the wearable device when the state of the channel with the network is continuously less than or equal to a reference value for a specified second time.

According to various embodiments, the identifying of the movement state of the wearable device includes, identifying whether a display of the wearable device is activated when the state of the channel satisfies the specified condition related to the connection restriction of the network, and identifying the movement state of the wearable device through the sensor when the display is in an inactive state.

According to various embodiments, the method may further include performing cell search when the display is in an active state, and identifying the movement state of the wearable device when a network accessible to the wearable device is not searched through the cell search.

According to various embodiments, the method may further include performing a network registration procedure, based on the searched network accessible to the wearable device, when the network is searched through the cell search.

According to various embodiments, the method may further include restricting a function of data transmission to an external device when the wearable device is in the stationary state.

According to various embodiments, the performing of the cell search according to the first period may include operating a timer that operates for the specified first time when the wearable device is in the stationary state, and performing cell search, based on the first period, when operation of the timer expires.

According to various embodiments, the method may further include identifying whether the movement state of the wearable device is switched when cell search is performed based on the first period, and changing the cell search period from the first period to the second period when the movement state of the wearable device is switched to the moving state.

According to various embodiments, the method may further include performing a network registration procedure, based on the searched network accessible to the wearable device when the network is searched through the cell search based on the first period or the second period.

While of the disclosure has been shown and disclosed with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
a sensor;
a wireless communication circuit;
memory storing instructions; and
a communication processor communicatively coupled to the sensor, the wireless communication circuit, and the memory,
wherein the instructions, when executed by the communication processor, cause the wearable device to:
identify a state of a channel with a network to which the wearable device is connected via the wireless communication circuit,
identify a movement state of the wearable device via the sensor,
if the state of the channel with the network is continuously equal to or less than a reference value for a specified number of times and the movement state of the wearable device is a stationary state, perform cell search according to a first period after a lapse of a specified time duration, and
in response to identifying that the movement state of the wearable device changes to a moving state while the state of the channel with the network is continuously equal to or less than the reference value for the specified number of times, perform cell search according to a second period relatively shorter than the first period.

2. The wearable device of claim 1, wherein the instructions, when executed by the communication processor, further cause the wearable device to:
monitor paging of the network according to a third period negotiated with the network in response to the state of being connected to the network being a radio resource control (RRC) idle state; and
identify the state of the channel of the network according to the third period.

3. The wearable device of claim 1, further comprising:
a display,
wherein the instructions, when executed by the communication processor, further cause the wearable device to:
if the state of the channel with the network is continuously equal to or less than the reference value for the specified number of times, identify whether the display is in an active state, and
identify whether the movement state of the wearable device is the stationary state in response to identifying that the display is in an inactive state.

4. The wearable device of claim 3, wherein the instructions, when executed by the communication processor, further cause the wearable device to:
perform cell search in response to identifying that the display is in the active state; and
identify whether the movement state of the wearable device is the stationary state in response to a network accessible to the wearable device not being searched via the cell search.

5. The wearable device of claim 4, wherein the instructions, when executed by the communication processor, further cause the wearable device to:
perform a network registration procedure, based on a searched network accessible to the wearable device, in response to the network being searched via the cell search.

6. The wearable device of claim 1, further comprising:
an application processor,
wherein the instructions, when executed by the communication processor, is further cause the wearable device to:
transmit information related to a restriction of data transmission to the application processor if the state of the channel with the network is continuously equal to or less than the reference value for the specified number of times and the movement state of the wearable device is the stationary state, and
wherein the instructions, when executed by the application processor, further cause the wearable device to;
restrict a function of data transmission to an external device, based on the information related to the restriction of data transmission.

7. The wearable device of claim 1, wherein the instructions, when executed by the communication processor, is further configured cause the wearable device to:
operate a timer for the specified time duration if the state of the channel with the network is continuously equal to or less than the reference value for the specified number of times and the movement state of the wearable device is the stationary state; and
perform cell search, based on the first period, in response to the timer expiring.

8. A method performed by a wearable device, the method comprising:
identifying, by the wearable device, a state of a channel of with a network to which the wearable device is connected via a wireless communication circuit of the wearable device;
identifying, by the wearable device, a movement state of the wearable device;
if the state of the channel with the network is continuously equal to or less than a reference value for a specified number of times and the movement state of the wearable device is a stationary state, performing, by the wearable device, cell search according to a first period after a lapse of a specified time duration; and
in response to identifying that the movement state of the wearable device changes to a moving state while the state of the channel with the network is continuously equal to or less than the reference value for the specified number of times. performing, by the wearable device, cell search according to a second period relatively shorter than the first period.

9. The method of claim 8, wherein the identifying of the state of the channel comprises:
monitoring, by the wearable device, paging of the network according to a third period negotiated with the network in response to the state of being connected to the network being a radio resource control (RRC) idle state; and
identifying, by the wearable device, the state of the channel of the network according to the third period.

10. The method of claim 8, wherein the identifying of the movement state of the wearable device comprises:
if the state of the channel with the network is continuously equal to or less than the reference value for the specified number of times, identifying, by the wearable device, whether a display of the wearable device is activated in an active state; and identifying, by the wearable device, whether the movement state of the wearable device is the stationary state in response to identifying that the display is in an inactive state.

11. The method of claim 10, further comprising:

performing, by the wearable device. cell search in response to identifying that the display is in the active state;

identifying, by the wearable device, whether the movement state of the wearable device is the stationary state in response to a network accessible to the wearable device not being searched via the cell search; and performing, by the wearable device, a network registration procedure, based on a searched network accessible to the wearable device, in response to the network being searched via the cell search.

12. The method of claim 8, further comprising:

restricting, by the wearable device, a function of data transmission to an external device if the state of the channel with the network is continuously equal to or less than the reference value for the specified number of times and the movement state of the wearable device is the stationary state.

13. The method of claim 8, wherein the performing of the cell search according to the first period comprises:

operating, by the wearable device, a timer for the specified time duration if the state of the channel with the network is continuously equal to or less than the reference value for the specified number of times and the movement state of the wearable device is the stationary state; and performing, by the wearable device, cell search, based on the first period, in response to the timer expiring.

14. The method of claim 8, further comprising:

performing, by the wearable device, a network registration procedure, based on a searched network accessible to the wearable device, in response to the network being searched via the cell search based on the first period or the second period.

15. A non-transitory computer-readable storage medium storing computer-executable instructions for operating a wearable device that, when executed by at least one processor of the wearable device, cause the wearable device to:

identify a state of a channel with a network to which the wearable device is connected;

identify a movement state of the wearable device;

if the state of the channel with the network is continuously equal to or less than a reference value for a specified number of times and the movement state of the wearable device is a stationary state, perform cell search according to a first period after a lapse of a specified time duration; and in response to identifying that the movement state of the wearable device changes to a moving state while the state of the channel with the network is continuously equal to or less than the reference value for the specified number of times, perform cell search according to a second period relatively shorter than the first period.

16. The non-transitory computer-readable storage medium of claim 15, wherein the computer-executable instructions, when executed by the at least one processor, further cause the wearable device to:

monitor paging of the network according to a third period negotiated with the network in response to the state of being connected to the network being a radio resource control (RRC) idle state; and identify the state of the channel of the network according to the third period.

17. The non-transitory computer-readable storage medium of claim 15, wherein the computer-executable instructions, when executed by the at least one processor, further cause the wearable device to:

if the state of the channel with the network is continuously equal to or less than the reference value for the specified number of times, identify whether a display of the wearable device is in an active state; and identify whether the movement state of the wearable device is the stationary state in response to identifying that the display is in an inactive state.

18. The non-transitory computer-readable storage medium of claim 17, wherein the computer-executable instructions, when executed by the at least one processor, further cause the wearable device to:

perform cell search in response to identifying that the display is in the active state; and identify whether the movement state of the wearable device is the stationary state in response to a network accessible to the wearable device not being searched via the cell search.

19. The non-transitory computer-readable storage medium of claim 18, wherein the computer-executable instructions, when executed by the at least one processor, further cause the wearable device to:

perform a network registration procedure, based on a searched network accessible to the wearable device, in response to the network being searched via the cell search.

20. The non-transitory computer-readable storage medium of claim 15, wherein the computer-executable instructions, when executed by the at least one processor, further cause the wearable device to:

operate a timer for the specified time duration if the state of the channel with the network is continuously equal to or less than the reference value for the specified number of times and the movement state of the wearable device is the stationary state; and perform cell search, based on the first period, in response to the timer expiring.

* * * * *